United States Patent [19]

Yogo et al.

[11] Patent Number: 4,703,823

[45] Date of Patent: Nov. 3, 1987

[54] VEHICLE RUNNING CONTROL SYSTEM

[75] Inventors: Kazutoshi Yogo; Hideo Wakata, both of Nagoya, Japan

[73] Assignee: Nippondenso Co., Ltd., Kariya, Japan

[21] Appl. No.: 773,565

[22] Filed: Sep. 9, 1985

[30] Foreign Application Priority Data

Sep. 13, 1984 [JP] Japan ................................ 59-193769
Sep. 20, 1984 [JP] Japan ................................ 59-198248

[51] Int. Cl.⁴ ........................ B60K 31/00; F02D 11/04
[52] U.S. Cl. .................................... 180/197; 123/323; 123/361; 123/399; 364/426
[58] Field of Search ................. 180/197, 219; 123/328, 123/330, 319, 320, 323, 399, 361; 172/1; 364/433, 426

[56] References Cited

U.S. PATENT DOCUMENTS

| | | | |
|---|---|---|---|
| 3,776,355 | 12/1973 | Scherenberg | 180/197 |
| 3,844,371 | 10/1974 | Garcea | 180/197 |
| 3,941,203 | 3/1976 | Leconte | 123/329 |
| 3,982,509 | 9/1976 | Colling et al. | 180/197 X |
| 4,134,048 | 1/1979 | Schneider | 318/52 |
| 4,337,839 | 7/1982 | Taplin | 364/426 X |
| 4,360,089 | 11/1982 | Matsui et al. | 123/361 X |
| 4,367,805 | 1/1983 | Totani et al. | 123/361 X |
| 4,454,919 | 6/1984 | Arnold et al. | 180/197 X |
| 4,543,932 | 10/1985 | Sturdy | 123/361 X |

FOREIGN PATENT DOCUMENTS

| | | |
|---|---|---|
| 2435679 | 2/1975 | Fed. Rep. of Germany . |
| 2845296 | 4/1979 | Fed. Rep. of Germany . |
| 2832739 | 2/1980 | Fed. Rep. of Germany . |
| 3047100 | 7/1982 | Fed. Rep. of Germany . |
| 3143666 | 5/1983 | Fed. Rep. of Germany ...... 180/197 |
| 3237672 | 4/1984 | Fed. Rep. of Germany ...... 180/197 |
| 51-31915 | 9/1976 | Japan . |
| 122742 | 7/1984 | Japan .................................. 123/399 |

Primary Examiner—John J. Love
Assistant Examiner—Mitchell J. Hill
Attorney, Agent, or Firm—Cushman, Darby & Cushman

[57] ABSTRACT

Disclosed herein is a vehicle running control device having a slip preventing function where a throttle opening degree of an engine is decreased upon occurrence of slip on drive wheels at starting and acceleration to prevent slip, and a running speed control function where a vehicle running speed is controlled to a target value. The control device comprises a common drive source for the above-mentioned both functions, a reduction mechanism for generating a drive output reduced discretely by driving the drive source in a predetermined direction and in a reverse direction, and link mechanism for effecting an open/close control of a throttle by the drive output. In the running speed control operation, the open/close control of the throttle is effected through the reduction mechanism and the link mechanism by intermittently controlling a driving operation of the drive source in the predetermined direction. On the other hand, upon occurrence of the slip on the drive wheels, the throttle opening degree is decreased to prevent the slip by intermittently controlling a driving operation of the drive source in the reverse direction through the reduction mechanism and the link mechanism. Further, the link mechanism is provided with a damper mechanism for damping a repulsive force to an acceleration operating section due to forcible decrease in the throttle opening degree in the slip preventing operation.

9 Claims, 6 Drawing Figures

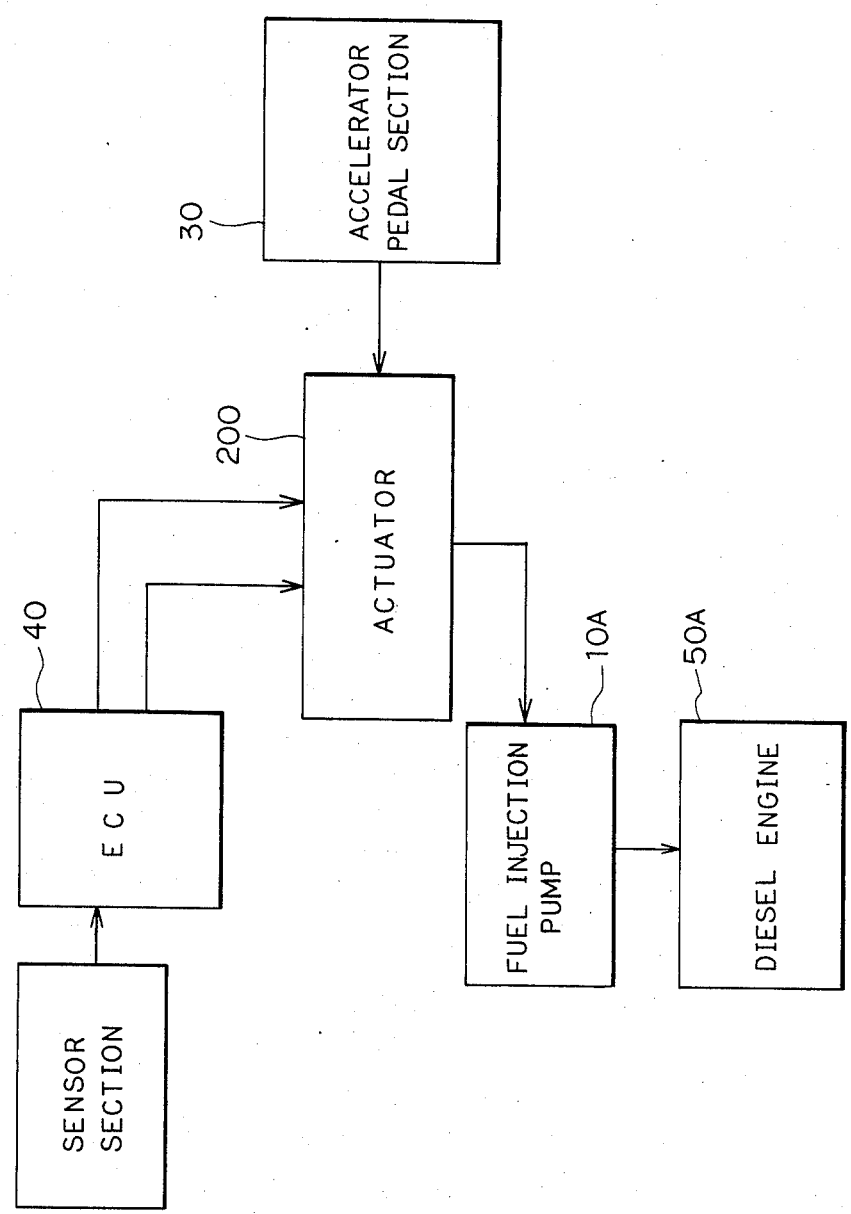

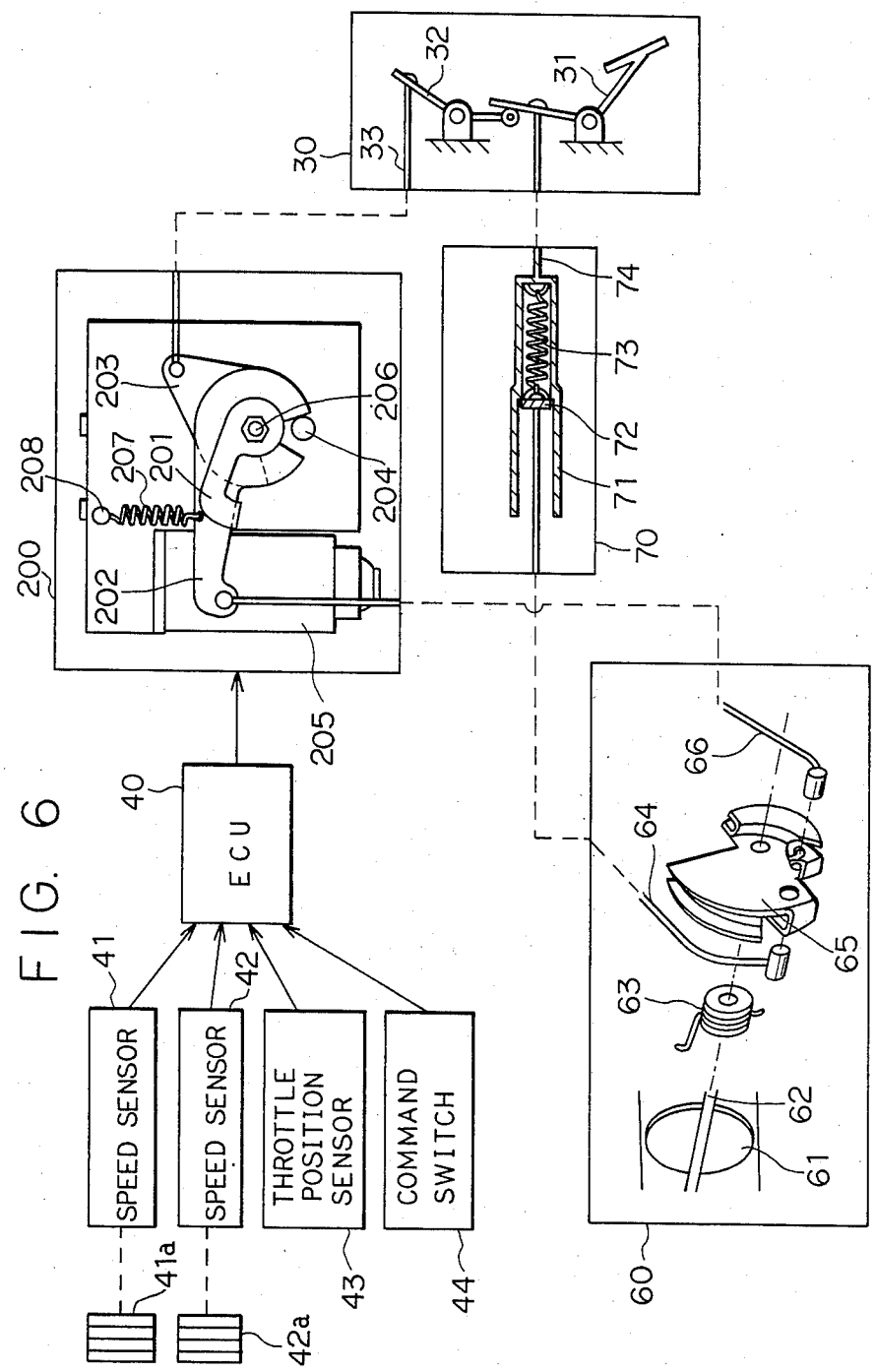

4,703,823

VEHICLE RUNNING CONTROL SYSTEM

BACKGROUND OF THE INVENTION

This invention relates to a vehicle runnning control system having composite function of preventing slip on drive wheels at starting and acceleration of the vehicle and controlling a running speed of the vehicle during running.

A conventional system of the type for preventing slip on the drive wheels has been disclosed in Japanese Publication No. 51-31915 entitled "Device for preventing Slip on Drive Wheel", wherein an opening degree of a carburetor (throttle) of an engine is decreased to reduce engine torque upon occurrence of the slip on the drive wheels.

The conventional system is provided with an actuator for slip prevention purpose only. However, in the case that a running speed control system (automatic drive) for controlling a vehicle running speed during running is provided in the vehicle, an actuator for opening and closing the throttle as required for the automatic drive must regulate the throttle opening degree accurately to an arbitral angle. Therefore, the automatic drive actuator has a performance remarkably different from that of the slip preventing actuator as above-mentioned which is designed to temporarily close the throttle with high speed responsibility, and the automatic drive actuator may not be simply combined with the preventing actuator. Accordingly, it is disadvantageously necessary to provide discrete actuators for the automatic drive and the slip prevention.

Further, in the conventional system as above-mentioned, a throttle shaft is directly connected through an accelerator cable to an accelerator pedal. Therefore, when the throttle opening degree is forcibly decreased by operating the slip preventing actuator, a repulsive force against a driving force of the actuator acts to push back the accelerator pedal and apply shock to a driver's foot.

As is mentioned above, the conventional system is not practical in the above various points.

SUMMARY OF THE INVENTION

It is a primary object of the present invention to provide a system for controlling a throttle opening degree to effectively prevent slip with a practical technique.

It is another object of the present invention to combine an automatic drive actuator with a slip preventing actuator, and sufficiently exhibit functions of both the actuators.

According to the present invention, there are provided a common drive source for the slip control function of the slip prevention and running control function of the automatic drive, a reduction mechanism for generating drive outputs discretely reduced by driving the drive source in a predetermined direction and in a reverse direction, and a link mechanism for selectively increasing and decreasing the engine torque by the drive outputs.

With the above-mentioned constitution, in a running control operation for controlling a vehicle running speed during running to a target value, engine operation is controlled to regulate the running speed by intermittently controlling a drive operation of the drive source in the predetermined direction through the reduction mechanism and the link mechanism. On the other hand, upon occurrence of slip on the drive wheels, the engine operation is intermittently reduced to prevent slip on the drive wheels at starting and acceleration by intermittently controlling the drive operation of the drive source in the reverse direction through the reduction mechanism and the link mechanism.

It is a further object of the present invention to prevent application of a repulsive force to an acceleration operating section when a throttle opening degree is forcibly decreased in operation of the acceleration operating section.

According to the present invention, there are provided an arm connected to a throttle for increasing and decreasing engine torque in the vehicle, a link mechanism for transmitting an operational force of the acceleration operating section to the arm, an actuator for directly driving the arm according to a control command for decreasing a throttle opening degree, and damper means interposed in the link mechanism for damping a repulsive force to the acceleration operating section due to a direct drive of the actuator.

With the above-mentioned constitution, when the throttle opening degree is forcibly decreased by the actuator in operation of the acceleration operating section, the repulsive force may be absorbed by a damping action of the damper means in the link mechanism thereby to prevent application of shock to the acceleration operating section.

BRIEF DESCRIPTION OF THE DRAWINGS

FIG. 5 is a general illustration of a second preferred embodiment of the present invention; and FIG. 6 is a general illustration of a third preferred embodiment of the present invention.

DETAILED DESCRIPTION OF THE PREFERRED EMBODIMENTS

Figure 1:
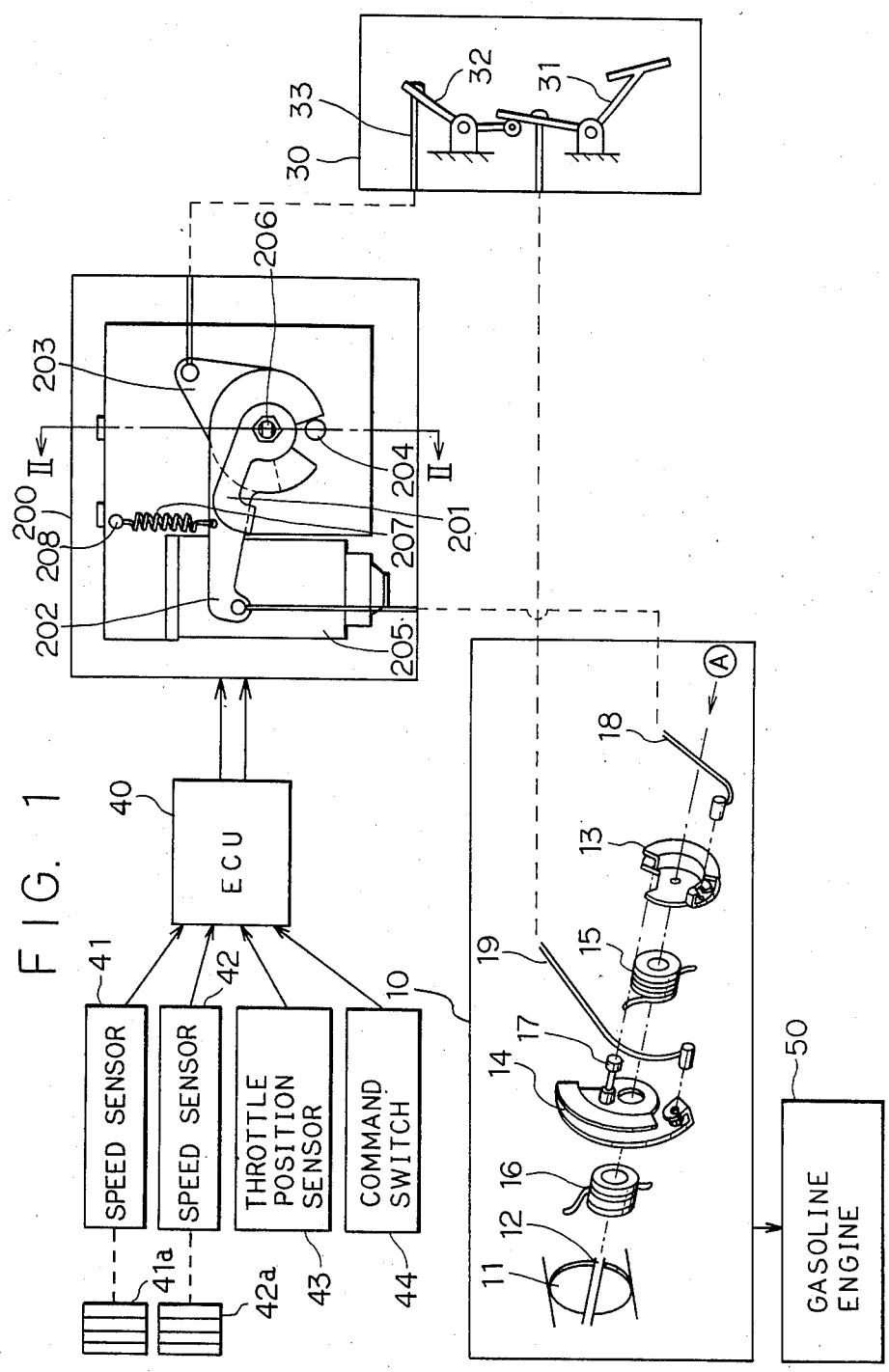
FIG. 1 is a general illustration of a first preferred embodiment of the present invention.

Referring to FIG. 1 which shows the general constitution of a vehicle running control device of a first preferred embodiment according to the present invention, reference numeral 10 designates a throttle section. A throttle valve 11 and an arm 13 are fixed to a throttle shaft 12, and an arm 14 is so mounted as to be idlable about the throttle shaft 12. A spring 16 is mounted at its both ends to a throttle body incorporating the throttle valve 11 and the arm 14. The arm 14 normally receives a force in a counterclockwise direction as viewed from a direction A relative to the throttle body (a rotation direction of the arm of the throttle section will be hereinafter defined as a direction as viewed from the direction A). A spring 15 acting as damping means is mounted at its both ends to the arm 13 and the arm 14, and urges the arm 13 clockwise to abut against a stopper 17 mounted on the arm 14. As a result, the throttle valve 11 normally receives a force in a closing direction (counterclockwise) by spring 16.

Reference numeral 200 designates a throttle actuator. A lever 201 is fixed to an output shaft 206 to be driven by a motor 205 as a drive source through a clutch and a gear (FIG. 2) in the actuator 200. The lever 201 is normally urged clockwise by a spring (not shown in FIG. 1, but which is spring 214 in FIG. 2) in the actuator, and which urges clockwise an arm 202 idlable about the output shaft 206. The arm 202 receives a clockwise force by a spring 207. An arm 203 idlable about the output shaft is urged only counterclockwise by the lever fixed to the output shaft 206 in the actuator and is designed to be rotated about the output shaft.

In other words, when the output shaft 206 is rotated in a clockwise direction by the motor 205, the arm 202 only is allowed to be rotated clockwise by the lever 201, while when the output shaft 206 is rotated in a counterclockwise direction, the arm 203 only is allowed to be rotated counterclockwise by the lever in the actuator. Reference numerals 204 and 208 designate a stopper for limiting a rotation range of the arms 202 and 203 and a stopper for fixing an end of the spring 207 to an actuator body, respectively.

Reference numeral 30 designates an accelerator operating section including a pedal section including an accelerator pedal 31 and a lever 32 for pushing the accelerator pedal 31. An accelerator cable 19 connects the accelerator pedal 31 with the arm 14 of the throttle section 10. The arm 14 is rotated clockwise by depression of the accelerator pedal 31 by an operator, and the throttle valve is opened through the spring 15 and the arm 13. A control cable 18 connects the arm 202 of the actuator 200 with the arm 13 of the throttle section 10. A control cable (link) 33 connects the arm 203 of the actuator 200 with the lever 32 of the accelerator pedal section 30.

There are provided a speed sensor 41 for detecting a speed of drive wheel 41a, a speed sensor 42 for detecting a speed of driven wheel 42a, a throttle position sensor 43 for detecting a throttle opening degree, a manually operable command switch 44 for generating various commands of automatic drive, and an electronic control unit 40 (which will be hereinafter referred to as ECU) for receiving signals from these sensors 41, 42 and 43 and the command switch 44 and supplying a control signal to the actuator 200. The ECU incorporates a microcomputer.

Reference numeral 50 designates a gasoline engine, the amount of suction air for which is increased and decreased according to an opening degree of the throttle valve 11 of the throttle section thereby to increase and decrease the engine rotational speed (engine torque) in operation.

A reduction mechanism for obtaining a drive force of different reduction ratios includes gears 216, 217, 218 and 220, and a link mechanism includes the arms 202 and 203 and the throttle section 10.

Figure 2:
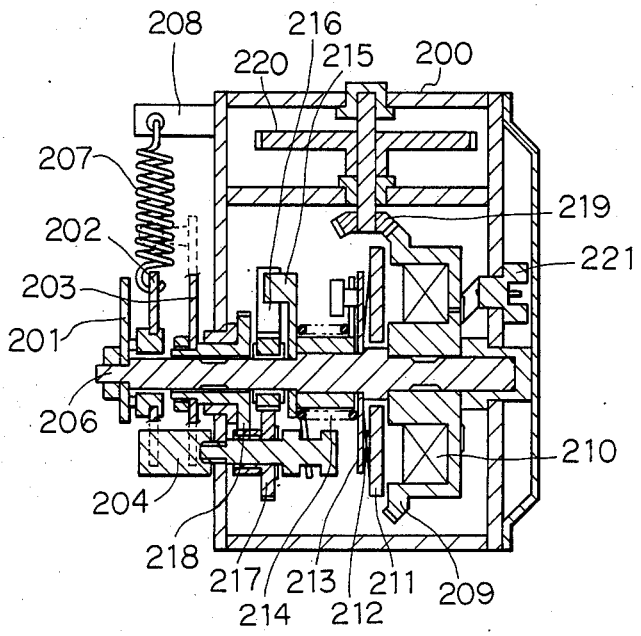
FIG. 2 is a cross section taten along the line II—II in FIG. 1.

Referring next to FIG. 2 shown in cross section taken along the line II—II of the actuator 200 in FIG. 1, there will now be described the actuator 200 in FIG. 1. As shown in FIG. 2, the lever 201, lever 215 plate 213 are fixed to the output shaft 206. The gear 218 which the arm 203 is fixed, the arm 202, the gear 216 and electromagnetic clutch 209 are designed to be idlable about the output shaft 206. The arm 202 normally receives a clockwise force by the spring 207. This constitutes the first link as it is connected to the cable 19 and transmits motion from the output shaft 206 depending on the direction of rotation of the shaft 206. The other, or second, link includes arm 203, which transmits motion from the output shaft 206 through the throttle pedal and cable 18 to shaft 12. It will thus be seen that arms 202 and 203 comprise first and second link mechanisms for the first and second drive outputs. The output shaft 206 itself normally receives a clockwise force by the spring 214. A clutch plate 211 is mounted through a leaf spring 212 to the plate 213. When an electromagnetic coil 210 is excited, the clutch plate 211 is combined with a clutch 209, and the output shaft 206 is allowed to be driven by the motor 205 through ggerars 220 and 219 and the clutch 209. When the output shaft 206 is rotated clockwise by the motor 205, the arm 202 is urged by the lever 201 and rotated in the direction. As a result, the arm 13 is pulled through the control cable 18, and the throttle valve is moved to its closed position. On the other hand, when the output shaft 206 is rotated counterclockwise, the lever 215 abuts against the gear 216. When the output shaft 206 is further rotated in the same direction, the gear 216 is urged by the lever 215 and rotated in the same direction. The gear 216 is further rotated counterclockwise to such a position where the arm 203 is stopped by the stopper 204. Rotation of gear 216 is effected by contact with the lever 215 and the rotary motion of gear 216 is transmitted through gears 217 and 218 to arm 203 to rotate the arm 203. The actuator includes a terminal 221 for feeding current to the electromagnetic coil 210.

The vehicle running control device described above is operated as follows:

(a) Normal accelerating operation:

When the accelerator pedal 31 is depressed by an operator, the accelerator cable 19 is pulled, and the arm 14 of the throttle section 10 is rotated clockwise. As the arm 13 is normally abutted against the stopped 17 by the spring 15, and is rotated with the arm 14, the throttle shaft 12 is rotated to open the throttle valve 11. That is to say, the rotation of the arm 14 is transmitted through the spring 15 and the arm 13 to the throttle shaft 12. At this time, the control cable 18 is also pulled by the rotation of the arm 13. Accordingly, the arm 202 of the actuator 200 is also rotated counterclockwise by the control cable 18, and the lever 201 is urged by the arm 202 to be rotated in the same direction.

On the other hand, when the amount of depression of the accelerator pedal 31 is decreased by the operator, the arm 14 is rotated counterclockwise by the spring 16, and the arm 13 is also urged by the stopper 17 to be rotated in the same direction. As a result, the opening degree of the throttle valve 11 is decreased. At this time, the control cable 18 is loosened by the rotation of the arm 13, and the arm 202 is rotated clockwise by the spring 207. The lever 201 is also rotated in the same direction by the spring (not shown, but which is the spring 214 in FIG. 2) in the actuator.

(b) Slip control operation:

The following control is carried out for the purpose of preventing that excessive slip is generated on the drive wheels upon starting and rapid accelerator, resulting in loss of stability in a vehicle and deterioration of acceleration performance.

Namely, slip on the drive wheels is always decided by the ECU 40 according to speed information from the speed sensors 41 and 42. Upon generation of the slip, the ecu 40 feeds a command to the actuator 200 so as to decrease a throttle opening degree and suppress engine torque to thereby suppress the slip.

When the electromagnetic clutch in the actuator is energized under an open condition of the throttle valve 11 to transmit a power of the motor 205 to the output shaft 206 and rotate the output shaft 206 clockwise, the arm 202 is rotated clockwise by the lever 201 fixed to the output shaft 206, and the arm 13 of the throttle section 10 is rotated counterclockwise through the control cable 18 thereby to decrease the throttle opening degree. At this time, although the operator's foot receives an undue force by the spring 15 because the arm 13 is separated from the stopper 17 fixed to the arm 14, such a spring force is small and therefore the accelerator pedal 31 is not forcibly pushed back.

Then, when current feed to the motor 205 is cut-off, the arm 13 is rotated clockwise by the spring 15 to the position where it abuts against the stopper 17, and the throttle opening degree is returned to an opening degree corresponding to the amount of depression of the accelerator pedal 31. Therefore, the throttle valve may be opened to an opening degree corresponding to the amount of depression of the accelerator pedal 31 by controlling ON/OFF of the motor 205 and gradually returning the arm 202 in accordance with reduction in the slip of the wheels.

(c) Automatic drive operation:

In automatic drive operation, the electromagnetic clutch in the actuator is engaged to allow motive power of the motor 205 to be transmitted to the output shaft 206, and current in the motor 205 is inverted from that in the slip control operation to rotate the output shaft 206 counterclockwise. As a result, the lever (not shown, but which is the lever 215) fixed to the output shaft 206 in the actuator is rotated counterclockwise to control the amount of depression of the accelerator pedal 31 through the control cable 33 and the lever 32. As shown in FIG. 2, the position where the gear 216 may be rotated by the lever 215 after counterclockwise rotation of the output shaft 206 is set to a position where the arm 202 is pulled counterclockwise upon full opening of the throttle valve to urge the lever 201 and rotate the output shaft 206, and then the output shaft 206 is further slightly rotated counterclockwise. Accordingly, the arm 203 is not moved during the normal accelerating operation and the slip control operation. The operation of the throttle section during the automatic drive control operation is the same as that during the normal accelerating operation.

Figure 3:
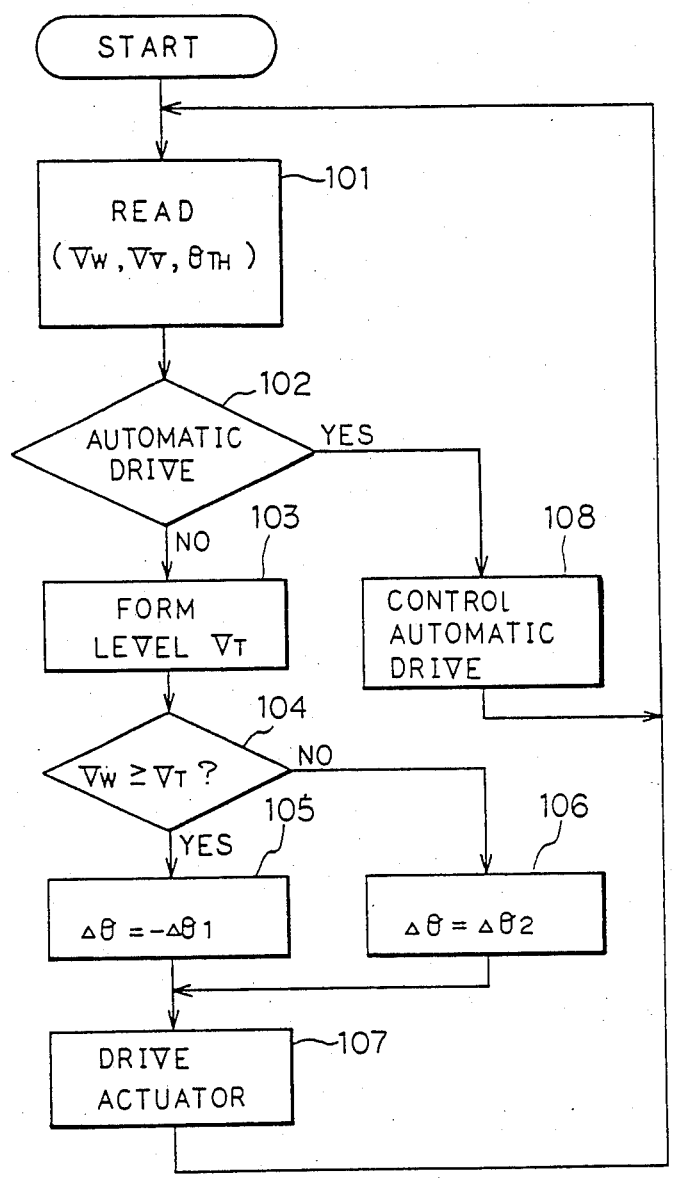
FIG. 3 is a flow chart showing operation of ECU in FIG. 1.

In the following, there will be described an exemplary operation of the ECU 40 with reference to a flow chart as shown in FIG. 3.

First, in step 101, a drive wheel speed $V_W$ driven wheel speed $V_V$ and throttle opening degree $\theta_{TH}$ are read from each of the sensors. Then, in step 102, it is determined whether or not an automatic drive execution mode, which indicates whether or not an operator sets a manual switch, is effective. If the automatic drive execution mode is effective, the routine goes to step 108. In the step 108, a program for the automatic drive is executed and the routine returns to the step 101. On the other hand, if the automatic drive execution mode is not effective, the routine goes to step 103, where a step decision level $V_T$ is formed. That is, the driven wheel speed $V_V$ is multipled K times (k=1.1-2.0) to be set at the target slip decision level $V_T$. Then, in step 104, the drive wheel speed $V_W$ is compared with the slip decision level $V_T$ to determined presence of slip. If $V_W \geq V_T$ is detected in the step 104, and the presence of slip determined, the routine proceeds to step 105. In the step 105, an amount of change $\Delta\theta$ in a throttle opening degree is set to $\Delta\theta = -\Delta\theta_1(\Delta\theta_1>0)$ so as to decrease the throttle opening degree and suppress an engine torque, and then the routine goes to step 107. On the other hand, if $V_W < V_V$ is detected in the step 104, and absence of slip is determined, the routine proceeds to step 106. In the step 106, the amount of change $\Delta\theta$ in the throttle opening degree is set to $\Delta\theta = \Delta\theta_2(\Delta\theta_2>0)$ so as to increase the throttle opening degree and increase the engine torque, and then the routine goes to the step 107. In the step 107, the actuator 200 is driven so that the throttle opening degree may be controlled to $\theta_{TH}+\Delta\theta$ and then the routine is returned to the step 101.

Figure 4:
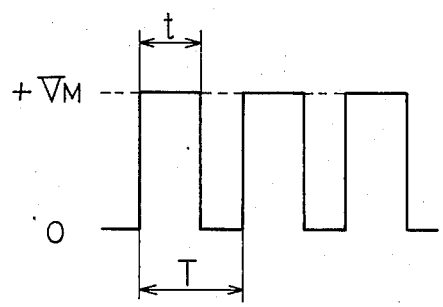
FIG. 4 is a waveform diagram for the operation of the ECU.

As shown in FIG. 4 illustrating a waveform diagram, the driving operation of the actuator is carried out by controlling a Duty ratio t/T (T: constant period) of a voltage pattern as applied to the motor. During the slip control operation, a direction of current flowing in the motor 205 is always constant, and an output torque of the actuator 200 always acts clockwise to increase with an increase in the Duty ratio of the voltage pattern. Accordingly, the throttle opening degree may be controlled by controlling the Duty ratio. If no slip is generated, the Duty ratio finally becomes 0%, and the actuator is returned to such a condition where the voltage to be applied to the motor is OFF.

The actuator 200 as mentioned above is of a structure permitting the slip control operation and the automatic drive control operation according to the difference in a rotational direction of the output shaft 206. A length of the arm 202 to be driven in the slip control operation is designed to be large for the slip control requiring rapid response, and a reduction ratio of the gears may be made small. On the other hand, in the automatic drive control operation, response may be slower than in the slip control operation, but resolution of the throttle opening degree is required to be great. To meet the requirement, the arm 203 for the automatic drive operation is designed to be driven by the output shaft 206 through the gears 216, 217 and 218. As a result, the reduction ratio may be enlarged to obtain necessary resolution.

Referring to FIG. 5 which shows a second preferred embodiment of the present invention, a Diesel engine 50A is used as a vehicle engine in substitution for the gasoline engine 50. In a manner similar to FIG. 1, a fuel control mechanism for a fuel injection pump 10A is controlled by the actuator 200.

Accordingly, similarly in a vehicle on which a Diesel engine is mounted, it is possible to effect composite control of the slip prevention for the drive wheels upon starting and acceleration and the automatic drive control operation.

Further, the present invention is also adaptable to vehicles on which any type of engines are mounted without being limited to the vehicle on which the gasoline engine and the Diesel engine are mounted.

In the first preferred embodiment as shown the FIG. 1, the spring 15 is set under such load where the arm 13 is not separated from the stopper 17 when the accelerator pedal 31 is rapidly depressed by the operator in a normal accelerating operation. The spring 15 is provided in the link mechanism between the accelerator pedal 31 and the arm 13. In this connection, there is shown a different constitution according to a third preferred embodiment in FIG. 6.

Referring to FIG. 6, a throttle section 60 is constituted in the following manner. That is, an arm 65 is fixed to a throttle shaft 62 to which a throttle valve 61 is fixed. A return spring 63 is mounted at its both ends to a throttle body and the arm 65. A spring force of the return spring 63 normally acts in the counterclockwise direction of the arm 65 (namely, in the closing direction of the throttle valve 61). An accelerator cable 64 and a control cable 66 are connected to the arm 65 in such a manner that the accelerator cable 64 pulls the arm 65 in the opening direction of the throttle valve 61, while the control cable 66 pulls the arm 65 in the closing direction of the throttle valve 61. In a manner similar to FIG. 1, the control cable 66 is connected at its one end to the arm 202 of the actuator 200. There is provided a cylinder housing 71 of a damper section 70 on the way of the accelerator cable 64. The cylinder housing 71 is directly connected to the accelerator pedal 31. A piston 72 in the cylinder housing 71 is connected through the accelerator cable 64 to the arm 65. The cylinder housing 71 is connected through a spring 73 to the piston 72 in such a manner as to be moved integrally with the piston 72 by the spring 73. A tensile force of the spring 73 is greater than a force of the spring 63 as applied to the arm 65, and is set to such a load where the cylinder housing 71 is not separated from the piston 72 when the accelerator pedal 31 is rapidly depressed by the operator. Accordingly, when a throttle opening degree is forcibly decreased by the actuator 200, a repulsive force against the force of the actuator is damped by the spring 73 thereby to prevent the accelerator pedal 31 from being pushed back.

In the preferred embodiments as mentioned above, the direction of current the motor is inverted between in the slip control operation and the automatic drive control operation, and the current in the motor is allowed to flow in one direction in each of the control operations, and the throttle opening degree is controlled by the Duty control. However, there may be provided a sensor for detecting an amount of depression of the accelerator pedal, and the throttle opening degree may be controlled by feeding forward and reverse current to the motor in each of the control operations and changing the Duty ratio in the range of $+100\%$ to $-100\%$.

Further, the actuator may include any power units (e.g., hydraulic or pneumatic device) other than the motor.

In the operation of the ECU, the amount of change in the throttle opening degree as changed according to presence or absence of slip may be given as a factor of the throttle opening degree $\theta_{TH}$ or engine condition, etc.

Further, in substitution for the constitution of the throttle section as shown in FIG. 1, there may be provided a throttle valve which may be directly operated through a throttle cable by depressing the accelerator pedal and a slip control valve arranged in series to the throttle valve in a suction pipe of the engine. A shaft of the slip control valve may be rotated by the arm 202.

What is claimed is:

1. A vehicle running control system comprising a common drive source operated by an electical output, slip detection means for detecting the occurrence of slip on the drive wheels, running speed control means for detecting and controlling the vehicle running speed so that the running speef is maintained at a target value automatically, said slip detection means and said running speed control means being capable of producing said electric output;

said common drive source being operated in response to a said electrical output from at least one of said slip detection means and said speed control detection means;

reduction means driven by said common drive source for generating first and second drive outputs with said first drive output being in one direction and said second drive output being in the opposite direction to said one direction, said first drive output being associated with said slip control function and said second drive output being associated with said speed control function, said reduction means including reduction ratios for each of said first and second drive outputs which are different from one another;

first and second link means each operatively connected respectively to one of said first and second drive outputs for adjusting, upon movement of said first and second drive outputs, a throttle valve;

said first link means comprising a first arm mounted for rotation by said first drive output in said one direction and a first cable means for connecting said first arm to the throttle valve, said second link means comprising a second arm mounted for rotation by said second drive output and a second cable means for connecting said second arm to an accelerator pedal which is operatively connected to the throttle valve, said second link means further comprising restraining means for controlling the amount of depression of the accelerator pedal in response to rotation of said second arm.

2. A system according to claim 1, wherein a length of said first arm is larger than that of said second arm.

3. A system according to claim 1 further comprising:
   a third arm fixed to a throttle shaft of said throttle valve and connected to said first cable; and
   a transmission mechanism connected to said accelerator pedal for transmitting an operational force of said accelerator pedal to said third arm.

4. A system according to claim 3, further comprising damper means interposed in said transmission mechanism for damping a repulsive force to said acceleration operating section due to the operation of said control cable.

5. A system according to claim 4, wherein said transmitting mechanism comprises:
   a fourth arm mounted to be idlable about said throttle shaft; and
   an accelerator cable for connecting said accelerator pedal with said fourth arm.

6. A system according to claim 5, wherein said damping means comprises a spring provided between said third and fourth arms.

7. A system according to claim 4, wherein said transmitting mechanism comprises an accelerator cable connected to said third arm to transmit the operational force of said acceleration operating section.

8. A control system for a vehicle having an engine and wheels driven by the engine, said engine having a throttle valve for regulating output torque thereof, said control system comprising:
   speed regulating means for automatically regulating, when activated, said throttle valve so that a running speed of said vehicle is maintained at a predetermined target speed;
   first means for detecting a slip of said wheels;
   second means for detecting an activation of said speed regulating means;
   electric motor means rotatable in first and second directions opposite to each other in response to outputs of said first and second means indicative of the slip of said wheels and said activation of said speed regulating means, respectively; and third means connecting said electric motor means with said throttle valve so that said throttle valve is rotated between an open and a closed position in response to the rotation of said electric motor means in said first and second directions, respectively, said third means having a first reduction gear mechanism of a first reduction ratio and a second reduction gear mechanism of a second reduction ratio larger than said first reduction ratio, said first and second reduction gear mechanisms being operatively connected to said electric motor means when the same is rotated in said first and second directions, respectively;

said third means further having a first control cable connecting said first reduction gear mechanism to said throttle valve for directly closing said throttle valve, and a second control cable connecting said second reduction gear mechanism to an accelerator pedal connected to said throttle valve for indirectly adjusting said throttle valve through said accelerator pedal.

9. A system according to claim 8 further comprising:
a first arm member fixed to a shaft of said throttle valve and to said first control cable;
a second arm member idlably mounted on said shaft of said throttle valve and linked to said accelerator pedal;
damping means interposed between said first arm member and said second arm member for transmitting rotation of said second arm member to said first arm member in the opening direction of said throttle valve and for suppressing repulsive force generated by said first arm member when said first arm member is rotated in the closing direction of said throttle valve by said first control cable.

* * * * *